United States Patent
Jang

(10) Patent No.: US 8,417,238 B2
(45) Date of Patent: Apr. 9, 2013

(54) APPARATUS FOR INTERFERENCE CANCELLING IN WIRELESS COMMUNICATION SYSTEM AND METHOD USING THE SAME

(75) Inventor: Uk Jang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/331,152

(22) Filed: Dec. 20, 2011

(65) Prior Publication Data

US 2012/0157084 A1    Jun. 21, 2012

(30) Foreign Application Priority Data

Dec. 21, 2010    (KR) .................. 10-2010-0131575

(51) Int. Cl.
*H04W 24/00*    (2009.01)
(52) U.S. Cl.
USPC ....................... 455/422.1; 370/252
(58) Field of Classification Search ........... 455/422.1, 455/513, 501, 509, 452.2; 370/252, 242
See application file for complete search history.

(56) References Cited

U.S. PATENT DOCUMENTS

| | | | |
|---|---|---|---|
| 2010/0087203 | A1 | 4/2010 | Lee et al. |
| 2010/0216486 | A1 | 8/2010 | Kwon et al. |
| 2011/0070881 | A1 | 3/2011 | Hwang et al. |
| 2011/0098055 | A1* | 4/2011 | Kwon et al. ............... 455/452.2 |

FOREIGN PATENT DOCUMENTS

| | | |
|---|---|---|
| KR | 10-2010-0120939 | 11/2009 |
| KR | 10-2010-0038558 | 4/2010 |
| KR | 10-2010-0096325 | 9/2010 |

* cited by examiner

*Primary Examiner* — Phuoc Doan
(74) *Attorney, Agent, or Firm* — Staas & Halsey LLP

(57) ABSTRACT

An interference cancellation method include detecting macro terminals which experience interference between a first signal output from a macro base-station and a second signal delivered from a femto terminal that is greater than a reference value; determining the number of channels of the femto base-station by subtracting the number of the detected macro terminals from the number of antennas of the femto base-station; generating a transmission beamforming weight vector using channel information of a signal interfered by the first signal and the second signal and channel information of the first signal; and providing a service, using the transmission beamforming weight vector, to as many femto terminals as the number obtained by subtracting the number of the detected macro terminals, which experience the interference greater than the reference value, from the number of the antennas of the femto base-station.

13 Claims, 7 Drawing Sheets

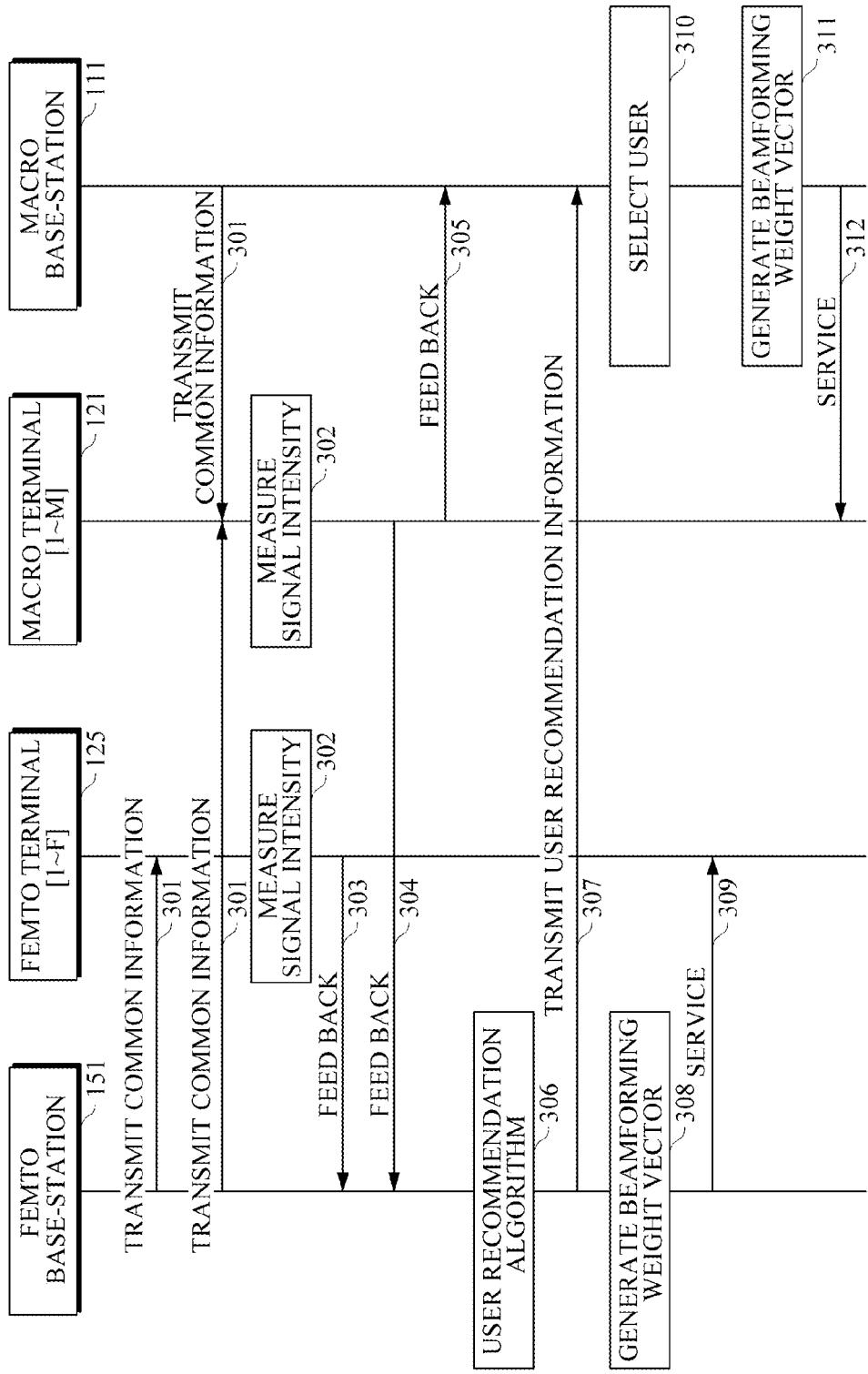

APPARATUS FOR INTERFERENCE CANCELLING IN WIRELESS COMMUNICATION SYSTEM AND METHOD USING THE SAME

CROSS-REFERENCE TO RELATED APPLICATION(S)

This application claims the benefit under 35 U.S.C. §119(a) of Korean Patent Application No. 10-2010-0131575, filed on Dec. 21, 2010, in the Korean Intellectual Property Office, the entire disclosure of which is incorporated herein by reference for all purposes.

BACKGROUND

1. Field

The following description relates to a wireless transmission apparatus for transmitting a signal from which interference is cancelled, and an interference cancellation method, and more particularly, to a wireless transmission apparatus for cancelling interference between a macrocell and a femtocell and transmitting a signal from which the interference is cancelled and an interference cancellation method.

2. Description of the Related Art

Recently, to overcome communication performance deterioration occurring in a shadow area caused by large buildings or movement between base-stations of a cellular-type wireless communication system and to secure a higher level of data transfer rate, it has been suggested to form femtocells in an area such as a macrocell.

A femtocell as a small version of a macrocell is a base-station that is installed indoors by plug-and-play to cover a short range of area with low power, and because of its short transmission range, power loss may be negligible. Hence, much attention is focused on femtocells to improve quality of service for indoor users at low cost. The femtocell uses an existing Internet network of a cable network provider, such as xDSL, and directly provides a service to a terminal. Thus, once the femtocell is installed, a high data transfer rate can be ensured without requiring the user to have an additional module in his/her mobile phone.

However, if multiple femtocells in a macrocell are running in the same frequency band, the macrocell and the femtocells are overlapping, resulting in various technical problems, and thus interference between the macrocell and the femtocells needs to be dealt with. In particular, it is more important to reduce interference of the macrocell placed near the femtocell to the user.

SUMMARY

The following description relates to a wireless transmission apparatus for interference cancellation and an interference cancellation method in a wireless communication system to improve a communication service by integrally managing individual networks.

In one general aspect, there is provided an interference cancellation method of a wireless transmission apparatus, including: detecting macro terminals which experience interference between a first signal output from a macro base-station and a second signal delivered from a femto terminal that is greater than a reference value; determining the number of channels of the femto base-station by subtracting the number of the detected macro terminals from the number of antennas of the femto base-station; generating a transmission beamforming weight vector using channel information of a signal interfered by the first signal and the second signal and channel information of the first signal; and providing a service, using the transmission beamforming weight vector, to as many femto terminals as the number obtained by subtracting the number of the detected macro terminals, which experience the interference greater than the reference value, from the number of the antennas of the femto base-station.

The interference cancellation method may further include delivering, from the femto base-station, the number of the detected macro terminals to the macro base-station, selecting, at the macro base-station, a predetermined number of terminals corresponding to a number obtained by subtracting a predetermined value, which corresponds to the number of the detected macro terminals, from the number of antennas of the macro base-station, adding the number of macro terminals recommended by the femto base-station, which corresponds to the predetermined value, to the number of the terminals selected by the macro base-station, and providing the transmission beamforming weight vector to a same number of macro terminals as the number of the antennas of the macro base-station.

The transmission beamforming weight vector may be obtained by Equation 1, $$H(S_F) = [(h_{F,1})^*, \ldots, (h_{F,N_F-\alpha})^*, (h_{M,1}^I)^*, \ldots, (h_{M,\alpha}^I)^*]^*$$

$$W(S_F) = H(S_F)^\dagger = H(S_F)^*(H(S_F)H(S_F)^*)^{-1},$$

where $H(S_F)$ represents a procedure of the femto base-station collecting channels for generating a beamforming weight vector, $W(S_F)$ represents a transmission beamforming weight vector generated by the femto base-station, and $N_F - \alpha$ represents a difference between the total number of antennas of one femto base-station and a value of $\alpha$.

The transmission beamforming weight vector generated by the macro base-station may be obtained by Equation 2

$$H(S_M) = [(h_{M,1})^*, \ldots, (h_{M,N_M})^*]^*$$

$$W(S_M) = H(S_M)^\dagger = H(S_M)^*(H(S_M)H(S_M)^*)^{-1},$$

where $H(S_M)$ represents a procedure of the macro base-station collecting channels for generating the beamforming weight vector, $W(S_M)$ represents the transmission beamforming weight vector generated by the macro base-station, and $N_M$ represents the total number of antennas of the macro base-station.

The detecting of the macro terminals which experience the interference by the femtocell greater than the reference value may include transmitting a signal including common information from the femto base-station and the macro base-station, respectively, to the femto terminals and the macro terminals, and detecting the macro terminals which experience the interference greater than the reference value using an intensity of the signal including common information.

The femto base-station may output a signal having a different frequency from that of a neighboring femto base-station.

Terminals which receive a signal output from the macro base-station and which experience interference between the signal output from the macro base-station and the signal output from the femto base-station that is greater than the reference value may be located on an edge of a macrocell produced by the macro base-station.

The femto base-station may transmit the signal including the common information to the macro terminals.

The common information may include a pilot signal, a paging signal, and a broadcast signal.

In another general aspect, there is provided a wireless transmission apparatus including: a plurality of antennas, each configured to transmit and receive a signal to/from a terminal in a femtocell and to transmit and receive a signal to/from a terminal in a macrocell; a signal measurement unit configured to measure an intensity of a signal received from each terminal in the femtocell and from each terminal in the macrocell; and a control unit configured to recognize channel information of the femtocell and the channel information of the macrocell based on the signal intensity measured by the signal measurement unit and to generate a transmission beamforming vector using the channel information of the femtocell and interference channel information.

The control unit may be further configured to recognize the channel information of the femto base-station by subtracting the number of macro terminals from the number of antennas of the femto base-station, where each of the macro terminals experiences interference between a first signal output from the macro base-station and a second signal delivered from a femto terminal that is greater than a reference value, and to generate a transmission beamforming weight vector using channel information of a signal generated by interference between the first signal and the second signal and channel information of the first signal.

The control unit may be further configured to, using the transmission beamforming weight vector, provide a service to as many femto terminals as the number obtained by subtracting the number of the macro terminals, which experience the interference greater than the reference value, from the number of the antennas of the femto base-station.

The signal measurement unit may be further configured to transmit a signal including common information, respectively, to users of the femto terminals and users of the macro terminals, and to detect users which experience the interference greater than the reference value using an intensity of the signal including common information.

The common information may include a pilot signal, a paging signal, and a broadcast signal.

Other features and aspects may be apparent from the following detailed description, the drawings, and the claims.

BRIEF DESCRIPTION OF THE DRAWINGS

FIG. 3 is a flowchart illustrating an example of a method of reducing interference from a wireless communication system using a wireless communication apparatus.

Figure 1:
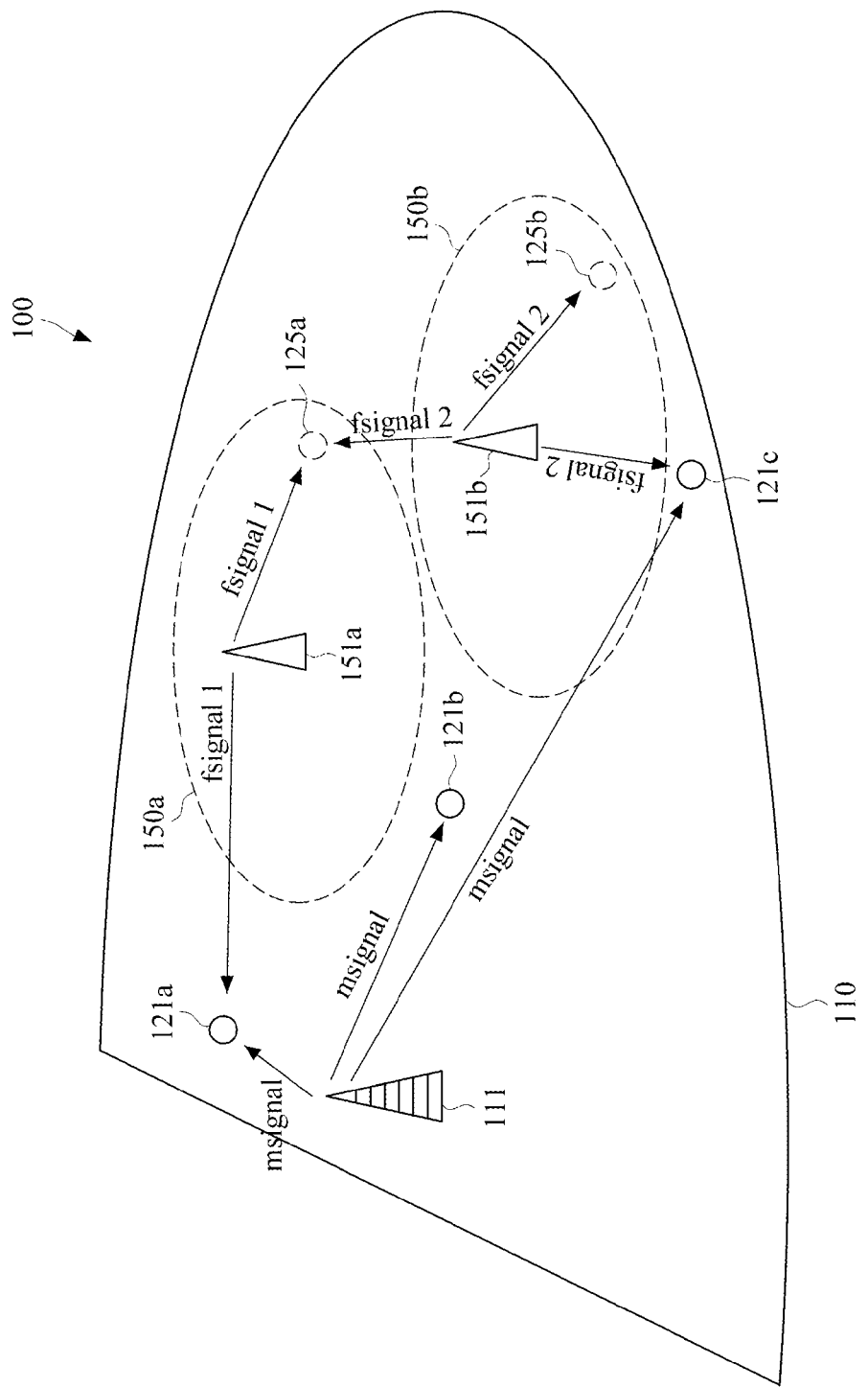
FIG. 1 is an illustration showing an example of a wireless communication system using a wireless transmission apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a wireless communication system using a wireless transmission apparatus.

Referring to FIG. 1, the wireless communication system 100 may include a macro base-station 111 to transmit a signal to a macrocell, a first femto base-station 151a to transmit a signal to a first femtocell 150a, and a second femto base-station 151b to transmit a signal to a second femtocell 150b. In addition, the wireless communication system 100 may further include a first terminal 121a, a second terminal 121b, a third terminal 121c, a fourth terminal 125a and a fifth terminal 125b which are located within the macrocell 110. The first terminal 121a and the second terminal 121b which are spaced an adequate distance apart from the macro base-station 111 are macro terminals, each of which receives a first signal (represented as "msignal" in FIG. 1) from the macro base-station 111 without being influenced by distance or buildings. The third terminal 121c which is located on a border between the macrocell 110 and the second is femtocell 150b is a macrocell that receives the first signal (msignal) from the macro base-station 111 and a third signal (represented as "fsignal2" in FIG. 1) from the second femto base-station 151b. The fourth terminal 125a and the fifth terminal 125b may be femto terminals, which receive a second signal (represented as "fsignal1" in FIG. 1) and a third signal (represented as fsignal2" in FIG. 1), respectively, from the first femto base-station 151a of the first femtocell 150a and the second femto base-station 151b of the second femtocell 150b. In this case, the first femtocell 150a and the second femtocell 150b are located in an area, for example, in an area blocked by buildings or inside building, where the first signal (msignal) output from the macro base-station 111 weakens or cannot reach, and thus significant interference may not occur between the second signal (fsignal1) and the third signal (fsignal2) which are output from the respective first femto base-station 151a and second femto base-station 151b and the first signal (msignal) output from the macro base-station 111. Hence, the first terminal 121a and the second terminal 121b do not need to take into consideration interference between the first signal (msignal) from the macro base-station 111 and the second and third signals (fsignal1, fsignal2) from the respective first and second femto base-stations 151a and 151b.

Additionally, the first femtocell 150a and the second femtocell 150b do not require numerous frequency bands, and if they use different frequencies in accordance with predefined policies, signal interference does not occur. Thus, the second signal (fsignal1) output from the first femto base-station 151a does not interfere with the third signal (fsignal2) output from the second femto base-station 151b. Furthermore, since the fourth terminal 125a and the fifth terminal 125b are located at the area where the first signal (msignal) output from the macro base-station 111 is weak or not available and receives second signal (fsignal1) from the first femto base-station 151a or the third signal (fsignal2) from the second femto base-station 151b, it does not take into consideration the interference of the first signal (msignal) from the macro base-station 111.

The terminal such as the third terminal 121c that is located on a border of the macrocell 110 and close to the second femtocell 150b may, however, experience interference between the first signal (msignal) from the macro base-station 111 and the third signal (fsignal2) output from the second femto base-station 151b. Therefore, the interference between the first signal (msignal) from the macro base-station 111 and the third signal (fsignal2) may be a critical factor for the third terminal 121c.

The embodiment of the present invention may, thus, to be applied to the third terminal 121c located at a position where the interference by the second femtocell 150b to the macrocell 110 is greater than a reference value.

Figure 2A:
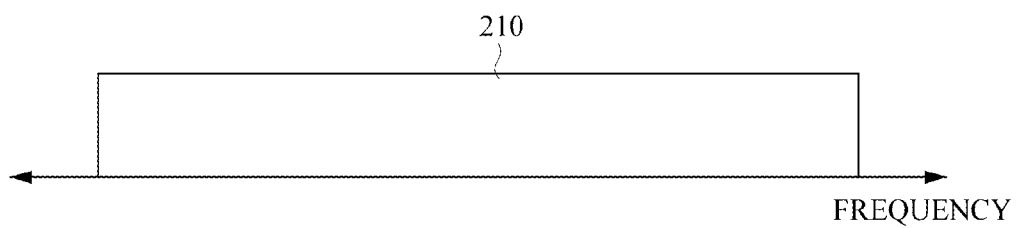
FIG. 2A is an illustration showing a frequency range used by a macrocell.
Figure 2B:
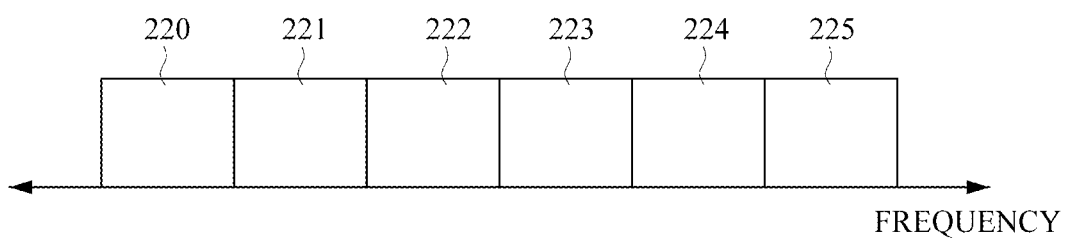
FIG. 2B is an illustration showing a frequency range used by a femtocell.

FIG. 2A is an illustration showing a frequency range used by a macrocell, and FIG. 2B is an illustration showing a frequency range used by a femtocell.

Referring to FIGS. 1, 2A and 2B, a first signal (msignal) output from the macrocell 110 is a single frequency range 210, and six femtocells are present in the single macrocell and divide the frequency range into six frequency ranges 221, 222, 223, 224, 225, and 226 to be output. Accordingly, because the femto base-stations output signals with different frequencies, a signal output from one femto base-station does not interfere with other signals output from neighboring femto base-stations.

FIG. 3 illustrates a flowchart of an example of a method of reducing interference from a wireless communication system using a wireless communication apparatus.

Referring to FIG. 3, a femto base-station 151 and a macro base-station 111 transmit common information to a femto terminal 125 in a femtocell and a macro terminal 121 in a macrocell 110, respectively (301). The reason for transmitting the common information is to obtain channel status information of each of the femto terminal 125 and the macro terminal 121, and the common information is an agreed signal which includes, for example, a pilot signal, a paging signal, a broadcast signal, and the like. In response to receiving the common information, the femto terminal 125 and the macro terminal 121 may yield the intensity of common information signal by calculating information such as signal-to-interference-plus-noise ratio (SINR) based on the received common information. Additionally, the macro terminal 121 calculates the intensity of each of common information signals for delivering the common information from the macro base-station 111 of the macrocell to which the macro terminal 121 is belonging, and for delivering the common information from the femto base-station 151 (302).

The femto terminal 125 feeds back to the femto base-station 151 the signal intensity, which has be calculated based on the common information from the femto base-station 151 of the femtocell to which the femto terminal 125 is belonging, and information about a channel between the femto base-station 151 and the femto terminal 125. The channel information to be fed back to the femto base-station 151 is as shown below.

$$h_{F,k}, k=\{1 \ldots F\}$$

Furthermore, the macro terminal 121 feeds back, to the macro base-station 111, information about the channel between the macro base-station 111 and the macro terminal 121 from among the intensity of common information signal received from the macro base-station 111 and the intensity of the common information signal received from the femto base-station 151 (304). The channel information to be fed back to the macro base-station 111 is as shown below.

$$h_{M,k}, k=\{1 \ldots M\}$$

Since the macro terminal 121 has received the common information signal from the femto base-station 151, it feeds back to the femto base-station 151 (305). In this case, if a plurality of femto cells exist around the macro terminal 121, the macro terminal 121 may feed back to the femto base-station 151 of each neighboring femtocell. The macro terminal 121 may is feed back information about interference channel between the macrocell and the femtocell to the femto base-station 151. The interference channel information is as shown below.

$$h^I_{M,k}, k=\{1 \ldots M\}$$

In response to receiving the information about the inference channel between the femto base-station 151 and the macro terminal 121, the femto base-station 151 selects a user using a user recommendation algorithm (306), and transmits user recommendation information to the macro base-station 111 (307).

The femto base-station 151 may use the channel information of the macro terminal 121 and information about interference channel of a signal output from the femto base-station 151 that interferes with the macro terminal 121 to generate a transmission beamforming weight vector calculated by Equation 1 below (308).

$$H(S_F)= [(h_{F,1})^*, \ldots, (h_{F,N_F-\alpha})^*, (h_{M,1}^I)^*, \ldots, (h_{M,\alpha}^I)^*]^*$$

$$W(S_F)=H(S_F)^\dagger=H(S_F)^*(H(S_F)H(S_F)^*)^{-1} \quad (1)$$

Here, $H(S_F)$ represents a procedure of the femto base-station 151 collecting channels for generating a beamforming weight vector, and $W(S_F)$ represents a transmission beamforming weight vector generated by the femto base-station 151. $N_F-\alpha$ represents a difference between the total number of antennas of one femto base-station 151 and a value of $\alpha$.

Then, the femto base-station 151 provides a service to the $N_F-\alpha$ femto terminals 125 belonging to the femtocell (309).

Meanwhile, the macro base-station 111 selects a terminal that experiences interference greater than a reference value from among macro terminals located on an edge of the macrocell based on the user recommendation information received from the femto base-station 151 (310). Then, the macro base-station 111 receives the channel information of the macro terminal 121 and the value of $\alpha$, which represents the number of macro terminals selected by the femto base-station 151 through the user recommendation algorithm, to generate a transmission beamforming weight vector represented by Equation 2 below (311).

$$H(S_M)=[(h_{M,1})^*, \ldots, (h_{M,N_M})^*]^*$$

$$W(S_M)=H(S_M)^\dagger=H(S_M)^*(H(S_M)H(S_M)^*)^{-1} \quad (2)$$

Here, $H(S_M)$ represents a procedure of the macro base-station 111 collecting channels for generating a beamforming weight vector, and $W(S_M)$ represents the transmission beamforming weight vector generated by the macro base-station 111. $N_M$ represents the total number of antennas of the macro base-station 111.

The macro base-station 111 may provide a service to the $N_M$ macro terminals 121 belonging to the macrocell using the transmission beamforming weight vector (312).

Figure 4:
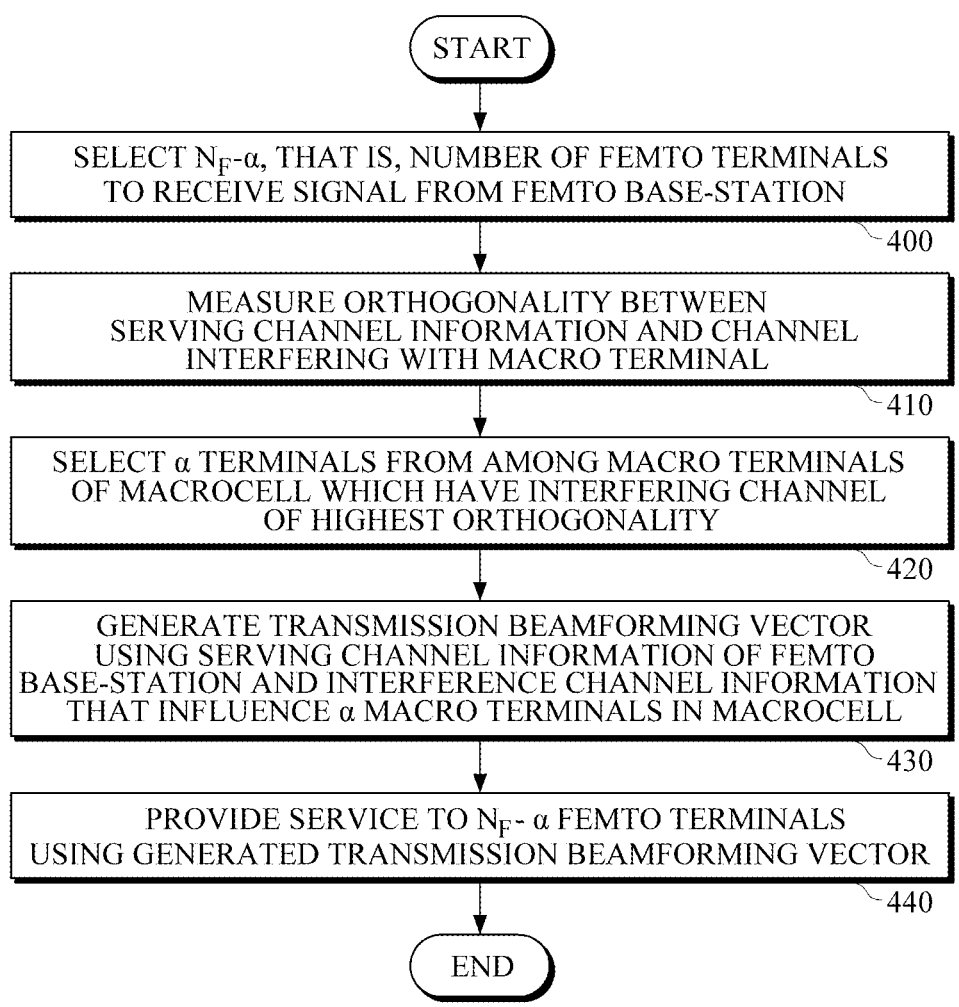
FIG. 4 is a flowchart illustrating an example of a use recommendation algorithm which is adopted by the femto base-station shown in the example illustrated in FIG. 1.

FIG. 4 illustrates a flowchart of an example of a use recommendation algorithm which is adopted by the femto base-station shown in the example illustrated in FIG. 1.

Referring to FIG. 4, the femto base-station 151 selects $N_F-\alpha$, that is the number of femto terminals to receive a signal from the femto base-station 151 (400). $N_F$ represents the number of antennas of the femto base-station 151, and $\alpha$ is an arbitrary number. The selected femto terminals 125 that receive the signal from the femto base-station 151 may measure orthogonality between the channel information and the interference channel between the femto base-station 151 and the macro terminals 121 which receive a signal from the macro base-station 111 around the femtocell (410). From among the macro terminals which have the interference channel of the highest orthogonality and are belonging to the macrocell, a terminals are selected (420). The femto base-station 151 generates a transmission beamforming vector as obtained by Equation 1 using information about a channel over which the femto base-station 151 and the femto terminals 125 communicate and the information about the interference channel that affects the a macro terminals of the macrocell 110 (430). In addition, the femto base-station 151 provides a service to $N_F-\alpha$ femto terminals using the generated transmission beamforming vector (440).

Figure 5:
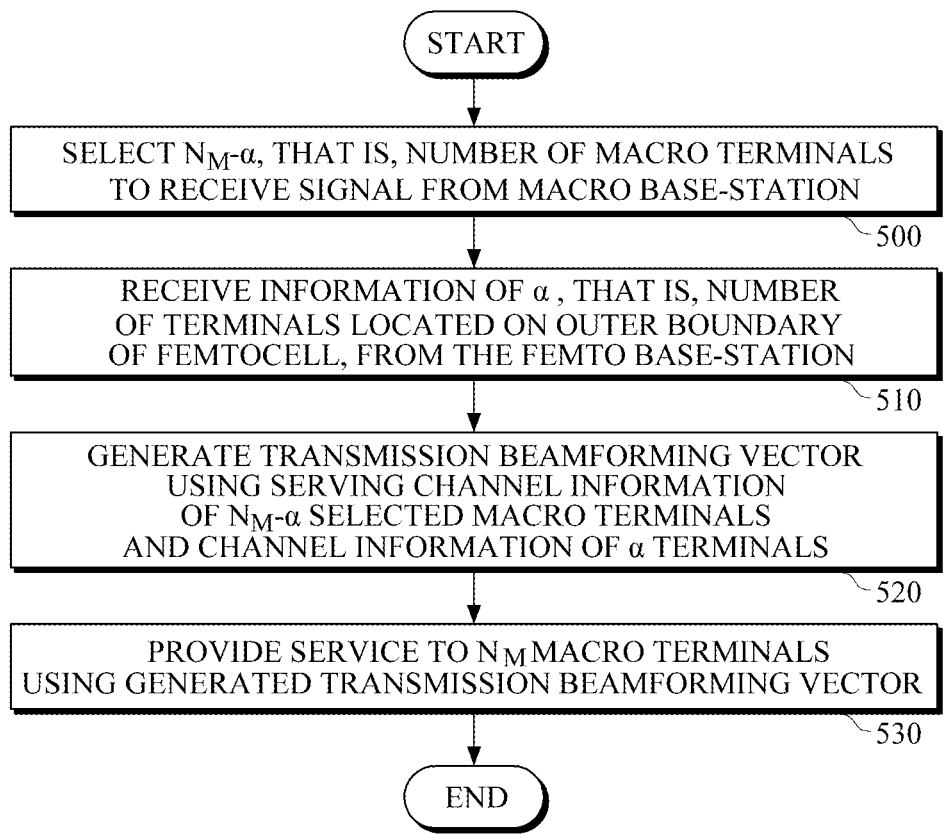
FIG. 5 is a flowchart illustrating an example of a user recommendation algorithm which is adopted by the macro base-station as shown in the example illustrated in FIG. 1.

FIG. 5 illustrates a flowchart of an example of a user recommendation algorithm which is adopted by the macro base-station as shown in the example illustrated in FIG. 1.

Referring to FIG. 5, the macro base-station 111 selects $N_M-\alpha$, that is, the number of macro terminals to receive a signal from the macro base-station 111 (500). Here, $N_M$ represents the number of antennas of the macro base-station 111, and $\alpha$ is an arbitrary number, which is the same as the number defined by the femto base-station 151. The macro base-station 111 receives information of a from the femto base-station 151, wherein $\alpha$ represents the number of the macro terminals that are selected by the femto base-station 151 among those located on an outer boundary of the macrocell and are more likely to be interfered with by the femto base-station 151 (510). The macro base-station 111 may generate a transmission beamforming vector as obtained by Equation 2 using channel information of the $N_M-\alpha$ terminals which are selected by the macro base-station 111 and channel information of the a terminals which are selected by the femto base-station 151 through the user recommendation algorithm (520), and provides a service to the $N_M$ terminals using the generated transmission beamforming vector (530).

Figure 6:
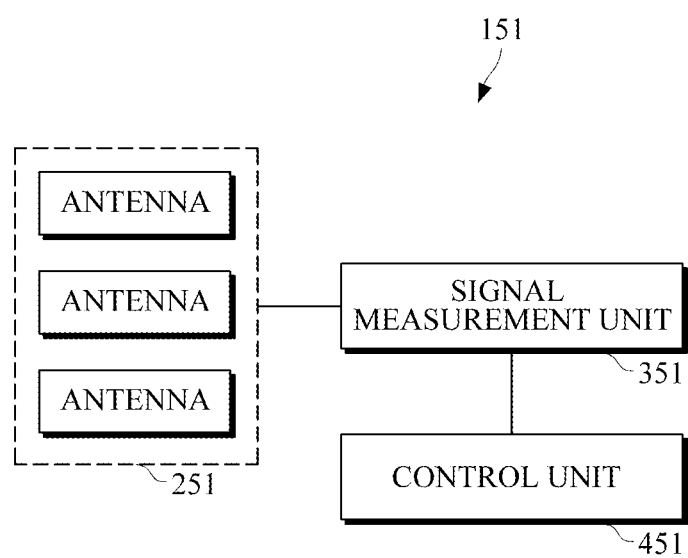
FIG. 6 is a diagram illustrating an example of the femto base-station shown in the example illustrated in FIG. 1.

FIG. 6 illustrates an example of the femto base-station shown in the example illustrated in FIG. 1.

Referring to FIG. 6, the femto base-station 151 may include a plurality of antennas 251, a signal measurement unit 351, and a control unit 451.

The antennas 251 transmit and receive signals to/from femto and macro terminals in the femto cell and the macro cell. The femto base-station 151 may enable frequencies for use in the cell to be shared among antennas 251 of the femto base-station 151, thereby preventing the signal interference from occurring in terminals in the femtocell.

The signal measurement unit 351 may receive the common information signals delivered from the antenna 251 which have received the signals from the terminals, and measure the intensity of each of the received common information signals. The terminals include femto terminals in the femtocell and macro terminals in the macrocell.

The control unit 451 may recognize information about a channel between the femto base-station 151 and the femto terminal 125 (see FIG. 3) and information about a channel between the femto base-station 151 and the macro terminal 121 (see FIG. 3) based on the intensity of the common information signals measured by the signal measurement unit 351. The control unit 451 may generate a transmission beamforming vector using the channel information between the femto base-station 151 and the femto terminal 125 and the interference channel information between the femto base-station 151 and the macro terminal 121. Although the femto base-station 151 has $N_F$ degrees of freedom, corresponding to the number of the antennas of the femto base-station 151, and thus can provide a service simultaneously to $N_F$ terminals in the femto cell, the control unit 451 may select only $N_F-\alpha$ terminals from the femtocell. That is, the femto base-station 151 enables to use degrees of freedom resulting from sparing a antennas to remove interference signals to be transmitted to the terminals in the macrocell. Then, by using the fed-back common information signal, orthogonality between $h_{F,k}$, $k=\{1 \ldots N_F-\alpha\}$ which is the channel information of the selected $N_F-\alpha$ terminals in the femtocell and $h_{M,k}^1$, $k=\{1 \ldots M\}$ which is an interference channel between the terminal in the macrocell around the femtocell and the femto base-station is measured.

As described in the above example, interference between a femtocell and a macrocell is cancelled, thereby improving a communication environment. Thus, no damage occurs to the transfer rate of a macrocell user even when more femtocells are added to the macrocell.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interference cancellation method of a wireless transmission apparatus, comprising:
    detecting macro terminals which experience interference between a first signal output from a macro base-station and a second signal delivered from a femto terminal which is greater than a reference value;
    determining the number of channels of the femto base-station by subtracting the number of the detected macro terminals from the number of antennas of the femto base-station;
    generating a transmission beamforming weight vector using channel information of a signal interfered by the first signal and the second signal and channel information of the first signal; and
    providing a service, using the transmission beamforming weight vector, to as many femto terminals as the number obtained by subtracting the number of the detected macro terminals, which experience the interference greater than the reference value, from the number of the antennas of the femto base-station.

2. The interference cancellation method of claim 1, further comprising:
    delivering, from the femto base-station, the number of the detected macro terminals to the macro base-station;
    selecting, at the macro base-station, a predetermined number of terminals corresponding to a number obtained by subtracting a predetermined value, which corresponds to the number of the detected macro terminals, from the number of antennas of the macro base-station,
    adding the number of macro terminals recommended by the femto base-station, which corresponds to the predetermined value, to the number of the terminals selected by the macro base-station, and providing the transmission beamforming weight vector to a same number of macro terminals as the number of the antennas of the macro base-station.

3. The interference cancellation method of claim 2, wherein the transmission beamforming weight vector generated by the macro base-station is obtained by Equation 2

$$H(S_M)=[(h_{M,1})^*,\ldots,(h_{M,N_M})^*]^*$$

$$W(S_M)=H(S_M)^\dagger=H(S_M)^*(H(S_M)H(S_M)^*)^{-1},$$

where $H(S_M)$ represents a procedure of the macro base-station collecting channels for generating the beamforming weight vector, $W(S_M)$ represents the transmission beamforming weight vector generated by the macro base-station, and $N_M$ represents the total number of antennas of the macro base-station.

4. The interference cancellation method of claim 2, wherein the detecting of the macro terminals which experience the interference by the femtocell greater than the reference value comprises transmitting a signal including common information from the femto base-station and the macro base-station, respectively, to the femto terminals and the macro terminals, and detecting the macro terminals which experience the interference greater than the reference value using an intensity of the signal including common information.

5. The interference cancellation method of claim 4, wherein the femto base-station outputs a signal having a different frequency from that of a neighboring femto base-station.

6. The interference cancellation method of claim 4, wherein the femto base-station transmits the signal including the common information to the macro terminals.

7. The interference cancellation method of claim 4, wherein the common information includes a pilot signal, a paging signal, and a broadcast signal.

8. The interference cancellation method of claim 1, wherein the transmission beamforming weight vector is obtained by Equation 1, $$H(S_F)=[(h_{F,1})^*,\ldots,(h_{F,N_F-\alpha})^*,(h_{M,1}^I)^*,\ldots,(h_{M,\alpha}^I)^*]^*$$

$$W(S_F)=H(S_F)^\dagger=H(S_F)^*(H(S_F)H(S_F)^*)^{-1},$$

where $H(S_F)$ represents a procedure of the femto base-station collecting channels for generating a beamforming weight vector, $W(S_F)$ represents a transmission beamforming weight vector generated by the femto base-station, and $N_F-\alpha$ represents a difference between the total number of antennas of one femto base-station and a value of $\alpha$.

9. The interference cancellation method of claim 1, terminals which receive a signal output from the macro base-station and which experience interference between the signal output from the macro base-station and the signal output from the femto base-station that is greater than the reference value are located on an edge of a macrocell produced by the macro base-station.

10. A wireless transmission apparatus comprising:
a plurality of antennas, each configured to transmit and receive a signal to/from a terminal in a femtocell and to transmit and receive a signal to/from a terminal in a macrocell;
a signal measurement unit configured to measure an intensity of a signal received from each terminal in the femtocell and from each terminal in the macrocell; and
a control unit configured to recognize channel information of the femtocell and the channel information of the macrocell based on the signal intensity measured by the signal measurement unit and to generate a transmission beamforming vector using the channel information of the femtocell and interference channel information,
wherein the control unit is further configured to recognize the channel information of the femto base-station by subtracting the number of macro terminals from the number of antennas of the femto base-station, where each of the macro terminals experiences interference between a first signal output from the macro base-station and a second signal delivered from a femto terminal that is greater than a reference value, and to generate a transmission beamforming weight vector using channel information of a signal generated by interference between the first signal and the second signal and channel information of the first signal.

11. The wireless transmission apparatus of claim 10, wherein the control unit is further configured to, using the transmission beamforming weight vector, provide a service to as many femto terminals as the number obtained by subtracting the number of the macro terminals, which experience the interference greater than the reference value, from the number of the antennas of the femto base-station.

12. A wireless transmission apparatus comprising:
a plurality of antennas, each configured to transmit and receive a signal to/from a terminal in a femtocell and to transmit and receive a signal to/from a terminal in a macrocell;
a signal measurement unit configured to measure an intensity of a signal received from each terminal in the femtocell and from each terminal in the macrocell; and
a control unit configured to recognize channel information of the femtocell and the channel information of the macrocell based on the signal intensity measured by the signal measurement unit and to generate a transmission beamforming vector using the channel information of the femtocell and interference channel information,
wherein the signal measurement unit is further configured to transmit a signal including common information, respectively, to users of the femto terminals and users of the macro terminals, and to detect users which experience the interference greater than the reference value using an intensity of the signal including common information.

13. The wireless transmission apparatus of claim 12, wherein the common information includes a pilot signal, a paging signal, and a broadcast signal.

* * * * *